United States Patent
Kim (10) Patent No.: US 10,911,657 B2
(45) Date of Patent: Feb. 2, 2021

(54) IMAGE SENSOR CHIP HAVING FUNCTION OF GENERATING FRAME SYNCHRONIZATION SIGNAL, ELECTRONIC DEVICE INCLUDING THE IMAGE SENSOR CHIP, AND METHOD FOR OPERATING THE IMAGE SENSOR CHIP

(71) Applicant: SK hynix Inc., Icheon-si (KR)

(72) Inventor: Tae Chan Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/567,986

(22) Filed: Sep. 11, 2019

(65) Prior Publication Data

US 2020/0236265 A1     Jul. 23, 2020

(30) Foreign Application Priority Data

Jan. 23, 2019  (KR) .................. 10-2019-0008481

(51) Int. Cl.
  *H04N 5/225*    (2006.01)
  *H04N 5/06*     (2006.01)
  *H04N 5/232*    (2006.01)
(52) U.S. Cl.
  CPC ............ *H04N 5/2258* (2013.01); *H04N 5/06* (2013.01); *H04N 5/23227* (2018.08); *H04N 5/23229* (2013.01)

(58) Field of Classification Search
  CPC ............ H04N 5/2258; H04N 5/23227; H04N 5/23229; H04N 5/06
  See application file for complete search history.

(56) References Cited

U.S. PATENT DOCUMENTS

| | | | |
|---|---|---|---|
| 2014/0192213 A1* | 7/2014 | Han | H04N 5/23238 348/218.1 |
| 2017/0085755 A1* | 3/2017 | Kim | H04N 5/23203 |
| 2017/0187928 A1* | 6/2017 | Kim | H04N 5/04 |
| 2017/0264823 A1* | 9/2017 | Takano | H04N 1/32577 |
| 2020/0068097 A1* | 2/2020 | He | H04N 5/23203 |

\* cited by examiner

*Primary Examiner* — Padma Haliyur
(74) *Attorney, Agent, or Firm* — Perkins Coie LLP (57) ABSTRACT

An image sensor chip, an electronic device, and a method for operating the image sensor chip are disclosed. The image sensor chip includes a frame synchronization signal converter configured to convert a first frame synchronization signal received from a first image sensor chip to generate a second frame synchronization signal, and an image generation block coupled to the frame synchronization signal converter and configured to generate image data based on the second frame synchronization signal at the same time point as the first frame synchronization signal.

20 Claims, 6 Drawing Sheets

IMAGE SENSOR CHIP HAVING FUNCTION OF GENERATING FRAME SYNCHRONIZATION SIGNAL, ELECTRONIC DEVICE INCLUDING THE IMAGE SENSOR CHIP, AND METHOD FOR OPERATING THE IMAGE SENSOR CHIP

CROSS-REFERENCE TO RELATED APPLICATION

This patent document claims the priority and benefits of Korean patent application No. 10-2019-0008481 filed on Jan. 23, 2019, the disclosure of which is incorporated herein by reference.

TECHNICAL FIELD

Embodiments of the disclosed technology generally relate to an image sensor chip, an electronic device, and a method for operating the images sensor chip.

BACKGROUND

An image sensing device is a semiconductor device for capturing images by converting light into an electrical signal. In recent times, with the increasing development of technologies in the computer and communication industries, the demand for high-quality, high-performance image sensors is rapidly increasing in various fields of technology such as smartphones, digital cameras, game consoles, Internet of Things (IoT), robots, surveillance cameras, medical micro-cameras, etc.

Image sensors may be broadly classified into charge coupled device (CCD)-based image sensors and complementary metal oxide semiconductor (CMOS)-based image sensors. The CCD image sensors offer the best available image quality. The downside is that they tend to consume more power and are larger as compared to CMOS image sensors. The CMOS image sensors are smaller in size and consume less power. They may be implemented using many different scanning schemes. In addition, because CMOS sensors are fabricated using the CMOS fabrication technology, CMOS sensors and other signal processing circuitry can be integrated into a single chip, resulting in reduction in production costs. In recent times, the CMOS image sensor has been designed to be more compatible with mobile devices, such that CMOS image sensing devices have been intensively researched and rapidly come into widespread use.

SUMMARY

This patent document provides, among others, designs of an image sensor chip, an electronic device, and a method for operating the image sensor chip.

Embodiments of this patent document relate to designs and operations of several image sensor chips that are integrated in a single electronic device.

In an embodiment of the disclosed technology, an image sensor chip includes a frame synchronization signal converter configured to convert a first frame synchronization signal received from a first image sensor chip separate from the image sensor chip to generate a second frame synchronization signal, and an image generation block configured to include an array of imaging sensor pixels to receive incident light to generate image data and coupled to the frame synchronization signal converter and configured to generate the image data based on the second frame synchronization signal at the same time point as the first frame synchronization signal.

In another embodiment of the disclosed technology, an electronic device includes an image sensor group including first, second and third image sensor chips, the first image sensor chip configured to generate a first frame synchronization signal, the second image sensor chip configured to convert the first frame synchronization signal to generate a second frame synchronization signal, the third image sensor chip configured to receive the second frame synchronization signal from the second image sensor chip, and a host in communication with the image sensor group and configured to process image data received from the image sensor group.

In another embodiment of the disclosed technology, a method for operating an image sensor chip includes generating a second frame synchronization signal by converting a first frame synchronization signal received from a first image sensor chip, and generating image data based on the second frame synchronization signal at the same time point as the first frame synchronization signal.

In another embodiment of the disclosed technology, an image sensor chip includes a frame synchronization signal converter configured to generate a second frame synchronization signal by performing conversion of a first frame synchronization signal received from a first image sensor chip, and an image generation block configured to generate image data at a time point based on the first frame synchronization signal.

In another embodiment of the disclosed technology, an electronic device includes an image sensor group including a first image sensor chip, a second image sensor chip configured to generate a second frame synchronization signal through conversion of a first frame synchronization signal received from the first image sensor chip, and a third image sensor chip configured to receive the second frame synchronization signal from the second image sensor chip, and a host configured to process image data received from the image sensor group.

In another embodiment of the disclosed technology, a method for operating an image sensor chip includes generating a second frame synchronization signal by performing conversion of a first frame synchronization signal received from a first image sensor chip, and generating image data at a time point based on the first frame synchronization signal.

It is to be understood that the foregoing general description, the accompanying drawings, and the following detailed description in this patent document disclosed technology are illustrative and explanatory of technical features and implementations of the disclosed technology.

DESCRIPTION OF EMBODIMENTS

Reference will now be made in detail to certain embodiments, examples of which are illustrated in the accompanying drawings. Wherever possible, the same reference numbers will be used throughout the drawings to refer to the same or similar parts.

The imaging technology disclosed in this patent document relate to optical imaging of a scene or object by using an image sensor group of two or more different image sensor chips in an electronic device or system configured to have different imaging characteristics and to perform frame synchronization between different image sensor chips in imaging one or more objects, a scene or a surrounding. The images from the two or more different image sensor chips can be processed to produce a desired final output image to enhance the imaging operation of the device or system over the imaging operation by using a single image sensor chip.

Figure 1:
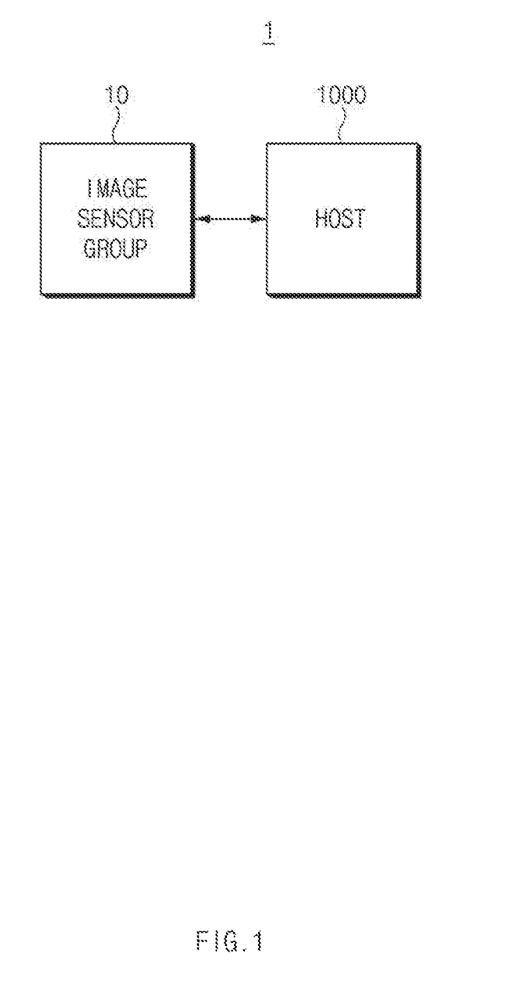
FIG. 1 is a block diagram illustrating an example of an electronic device based on an embodiment of the disclosed technology.

FIG. 1 is a block diagram illustrating an example of an electronic device or system 1 based on an embodiment of the disclosed technology.

Referring to FIG. 1, the electronic device 1 may include an image sensor group 10 having two or more different image sensor chips and a host 1000 in communication with the image sensor group 10. The electronic device 1 may be implemented in various forms or configurations capable of capturing images, including, for example, a mobile device (e.g., a smartphone, a digital camera, etc.), a personal computer (PC), a laptop, a household appliance, or industrial system.

The image sensor group 10 may include a plurality of image sensor chips, each of which can independently capture an image of a scene so different image sensor chips capture their respective images of the same scene. Such captured images of the same scene by the different image sensor chips in the image sensor group 10 can be used to produce a desired image of the scene. In an embodiment of the disclosed technology, the image sensor chips can be arranged in such a way that different image sensor chips detect a scene with different imaging characteristics. For example, the different image sensor chips can capture and detect light incident in different directions, respectively (e.g., imaging the surrounding at the front, back, side positions of the electronic device 1). In another embodiment of the disclosed technology, the image sensor chips can be arranged in such way that different image sensor chips detect light incident in the same or approximately the same direction with other different imaging characteristics. For example, the image sensor group 10 may combine a plurality of image sensor chips oriented in the same direction but with different focal lengths. In some implementations, the image sensor chips may be spaced apart from each other or may be adjacent to each other. The imaging characteristics of the image sensor chips of the image sensor group 10 may be different in other aspects, e.g., the shutter speeds or integration times.

Each image sensor chip may generate image data based on a request of the host 1000 or an interrupt message, and may transmit the generated image data to the host 1000. An interrupt message may indicate the presence of image data to be output through each image sensor chip due to occurrence of an event. The respective image sensor chips may simultaneously or sequentially transmit image data to the host 1000.

The host 1000 in communication with the image sensor group 10 may process image data received from the image sensor group 10, may store the processed image data, and may display or output the stored image data. By way of example and not by limitation, the host 1000 may be any one of an image signal processor (ISP), a central processing unit (CPU), a display, or an application processor (AP).

Figure 2:
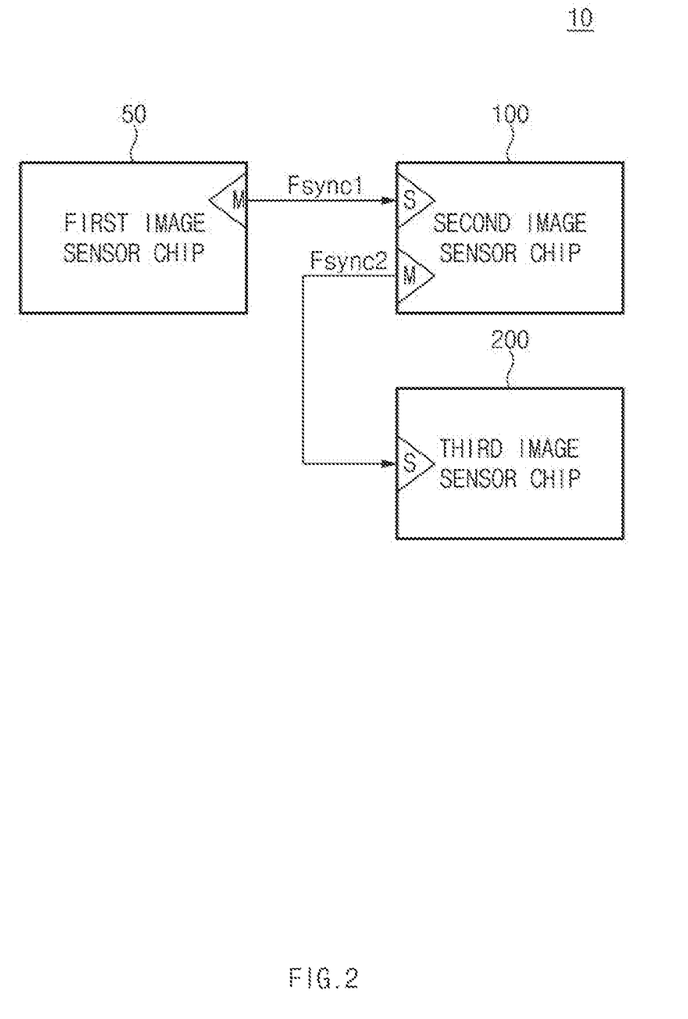
FIG. 2 is a block diagram illustrating an example of an image sensor group shown in FIG. 1 based on an embodiment of the disclosed technology.

FIG. 2 is a block diagram illustrating an example of the image sensor group 10 shown in FIG. 1 showing a first image sensor chip 50, a second image sensor chip 100, and a third image sensor chip 200 as examples of the different image sensor chips included in the image sensor group 10 and examples of their interconnections for carrying frame synchronization signals.

Each of the first to third image sensor chips 50, 100, and 200 may generate image data based on the captured scene, and may transmit the generated image data to the host 1000 in response to frame synchronization signals Fsync1 and Fsync2 on a frame basis. In this case, the frame may be a set or aggregate of pixel data acquired when only one scene is captured by the first to third image sensor chips 50, 100, and 200 at the same time. In addition, the frame synchronization signal Fsync1 or Fsync2 may be transmitted to the host 1000, such that the start or end point of each frame of the image data can be identified.

In some implementations, the different image sensor chips in the image sensor group 10 may be peer image sensor chips without being controlled by another image sensor chip. In implementations, one or more image sensor chips in the image sensor group 10 may be assigned certain controlling functions respect to other image sensor chips. For example, one image sensor chip from among the first to third image sensor chips may be designated as a master image sensor chip which transmits a single frame synchronization signal to slave at least one other image sensor chip by controlling the other image sensor chip. In one implementation, such a master image sensor chip may be a master to the remaining image sensor chips. Under this Master-Slave design, each slave image sensor chip transmits image data to the host 1000 based on a single frame synchronization signal from the master image sensor chip.

In different applications, the first to third image sensor chips 50, 100, and 200 may use different synchronization schemes in case they are manufactured to have different specifications (e.g., different resolutions and different frame rates). For example, when the first to third image sensor chips with different synchronization schemes transmit image data using the same frame synchronization signal, errors may occur due to the mis-synchronization.

In a synchronization scheme, the image sensor may identify the frame start point and end point based on the waveform of frame synchronization signals. For example, each of the image sensor chips may recognize a rising edge of a pulse-shaped frame synchronization signal as the frame start point, and may recognize a falling edge of the pulse-shaped frame synchronization signal as the frame end point. In this case, a duration of high voltage pulse may be used as a single frame. Alternatively, each image sensor chip may recognize the falling edge of the pulse-shaped frame synchronization signal as the frame start point, and may recognize the falling edge of the pulse-shaped frame synchronization signal as the frame end point. In this case, a duration of low voltage pulse may be used as a single frame. If the image sensor chips serving as the slave image sensor chips have different synchronization schemes, the respective image sensor chips may recognize the same frame synchronization signal as different frames having different timings. In this case, such an incompatibility may cause some of the image sensor chips to generate and/or output erroneous image data. Moreover, in some cases the host 1000 may not normally recognize the frame of the image data received from the respective image sensor chips.

In addition, image data generated by the respective image sensor chips may have different resolutions. The higher the resolution of image data, the longer the time it takes to generate/output image data corresponding to a single frame. In a situation where different slave image sensors are used, if image data of the different slave image sensor chips has different resolutions, some of the image sensor chips may normally generate and output image data based on a frame synchronization signal while the other image sensor chips (e.g., a high-resolution image sensor chip) may fail to output the entire image data, and an unexpected data loss may occur.

Alternatively, in the same situation where the image data of the different slave image sensor chips has different resolutions, such high-resolution image sensor chips may normally generate and output part of the image data based on the same frame synchronization signal. However, since they are not able to output the entire image data within a single frame, it will take another frame to output the remaining part of the image data, thus deteriorating the overall frame rate. If the image sensor chip is designed for a high-speed operation, the performance of the image sensor chip may be seriously deteriorated.

The image sensor group 10 shown in FIG. 2 is designed to address the above-mentioned issues. For frame synchronization between the first to third image sensor chips 50, 100, and 200, the image sensor group 10 may use a plurality of frame synchronization signals. In this case, the term "frame synchronization" may refer to a control operation that allows each of the image sensor chips 50, 100, and 200 to normally generate and output frame-based image data within a predefined frame.

For convenience of description, it is assumed that the first image sensor chip 50 from among the first to third image sensor chips 50, 100, 200 is set to a master image sensor chip. In addition, it is assumed that, while the first image sensor chip 50 and the second image sensor chip 100 can normally operate based on the same frame synchronization signal, the third image sensor chip 200 operates in a different way from the first and second image sensor chips 50 and 100 or may have a different specification from the first and second image sensor chips 50 and 100, such that the third image sensor chip 200 is unable to normally operate based on the same frame synchronization signal as in the first and second image sensor chips.

The first image sensor chip 50 may transmit a first frame synchronization signal (Fsync1) needed for frame synchronization to the second image sensor chip 100. The second image sensor chip 100 may generate and output image data within a predefined frame in response to the received first frame synchronization signal (Fsync1). In this case, the first image sensor chip 50 may output the first frame synchronization signal (Fsync1) through a master pin (M), and the second image sensor chip 100 may receive the first frame synchronization signal may receive the first frame synchronization signal (Fsync1) through a slave pin (S).

The third image sensor chip 200 may receive the second frame synchronization signal (Fsync2) needed for frame synchronization from the second image sensor chip 100 instead of the first image sensor chip 50. The third image sensor chip 200 may generate and output image data within a predefined frame based on the received second frame synchronization signal (Fsync2). In this case, during transmission and/or reception of the second frame synchronization signal (Fsync2), the second image sensor chip 100 may operate as the master image sensor chip, and the third image sensor chip 200 may operate as the slave image sensor chip. In other words, the second image sensor chip 100 may output the second frame synchronization signal (Fsync2) through the master pin (M), and the third image sensor chip 200 may receive the second frame synchronization signal (Fsync2) through the slave pin (S).

The second image sensor chip 100 may include two pins to transmit and receive the frame synchronization signals, respectively. The second image sensor chip 100 may convert the first frame synchronization signal (Fsync1) into another signal appropriate for operations of the third image sensor chip 200, such that the second image sensor chip 100 may generate the second frame synchronization signal (Fsync2). A detailed description of the above-mentioned operation in which the second image sensor chip 10 generates the second frame synchronization signal (Fsync2) through conversion of the first frame synchronization signal (Fsync1) will hereinafter be described with reference to FIGS. 3 to 6.

Figure 3:
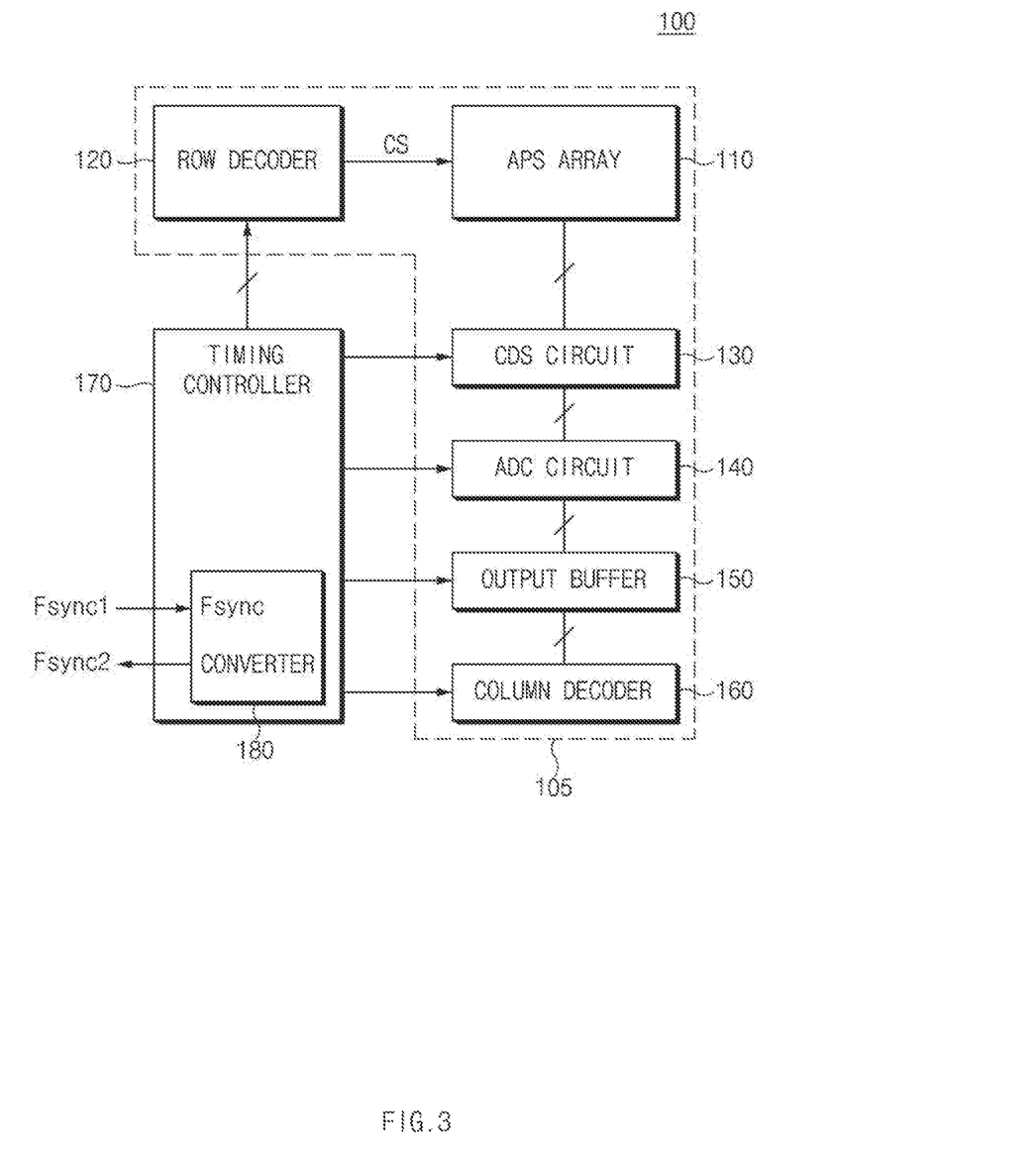
FIG. 3 is a block diagram illustrating an example of a second image sensor chip shown in FIG. 2 based on an embodiment of the disclosed technology.

FIG. 3 is a block diagram illustrating an example of the second image sensor chip 100 shown in FIG. 2.

Referring to FIG. 3, by way of example and not by limitation, the second image sensor chip 100 may include a imaging sensor array 110 which may also be referred to as an active pixel sensor (APS) array, a row decoder 120, a correlated double sampling (CDS) circuit 130, an analog-to-digital conversion (ADC) circuit 140, an output buffer 150, a column decoder 160, and a timing controller 170. It should be noted that at least one of the elements discussed above may be omitted or replaced with other elements. In FIG. 3, the elements 110-160 other than the timing controller 170 are included as part of one image generation block 105 for one image sensor chip of two or more different image sensor chips that are synchronized to performing imaging operations. Each image sensor chip may detect incident light at the imaging sensor array 110 within the image generation block 105 to generate and output image data at a time point based on the first frame synchronization signal (Fsync1).

The imaging sensor array 110 may include a plurality of pixels arranged in rows and columns. Each pixel of the imaging sensor array 110 may include a photoelectric conversion element (e.g., a photodiode) to convert incident light into an electrical signal, and at least one transistor to process the electrical signal. Each pixel may detect/convert light in response to a control signal (CS) output from the row driver 120, and the electrical signal generated by each pixel may be transmitted to the CDS block 130 through a plurality of column lines (not shown). Types of control signals (CS) may vary depending on the structure of respective pixels (e.g., 3T, 4T, 5T, etc.). For example, in the case of the 4T pixel structure, the control signal (CS) may include a reset control signal RG, a transmission (Tx) control signal TG, and a selection control signal SEL.

The row decoder 120 may generate the selection control signal SEL to select any one of the columns of the imaging sensor array 110. The row decoder 120 may transmit the reset control signal RS and the transmission control signal TG to pixels corresponding to the selected row. As a result, an analog-type reference signal (or a reset signal) and an image signal that are generated by the pixels of the selected row may be transmitted to the CDS circuit 130.

The CDS circuit 130 may sequentially sample and hold a set of the reference signal and the image signal that are transferred from the imaging sensor array 110 to each of the column lines. That is, the CDS circuit 130 may sample and hold levels of the reference signal and the image signal that correspond to each column.

The ADC circuit 140 may receive a correlated double sampling (CDS) signal for each column from the CDS circuit 130, may convert the received CDS signal into a digital signal, and may thus output image data based on the digital signal. For this purpose, the ADC circuit 140 may include comparators and counters each of which is assigned to one or more of the columns.

The output buffer 150 may receive image data for each column from the ADC circuit 140, may latch the received image data, and may output the latched image data. The output buffer 150 may temporarily store image data that is output from the ADC circuit 140, and may sequentially output the latched image data in response to a control signal received from the timing controller 170.

The column decoder 160 may select a column of the output buffer 150 in response to a control signal received from the timing controller 170. Upon selection of one or more columns by the column decoder 160, the output buffer 150 may sequentially output image data stored for each column.

The timing controller 170 may transmit a timing signal, a reference signal, and a control signal that are needed to generate and output image data to the imaging sensor array 110, the row decoder 120, the CDS circuit 130, the ADC circuit 140, the output buffer 150, and the column decoder 160. Specifically, the timing controller 170 may control the imaging sensor array 110, the row decoder 120, the CDS circuit 130, the ADC circuit 140, the output buffer 150, and the column decoder 160 in a manner that image data corresponding to a single frame can be generated and output during a frame time based on either an external frame synchronization signal received from an external part or an internal frame synchronization signal. That is, the frame synchronization signal may be a reference signal needed for the second image sensor chip 100 configured to generate and output image data corresponding to each frame.

As can be seen from the embodiment of FIG. 3, the timing controller 170 may receive the first frame synchronization signal (Fsync1), and may control the constituent elements of the second image sensor chip 100 in a manner that the image data corresponding to the single frame can be generated and output during the frame time based on the first frame synchronization signal (Fsync1). For example, upon receiving the first frame synchronization signal (Fsync1), the timing controller 170 may generate a horizontal synchronization signal (Hsync) to determine the scope of pixels to be activated in a single row, and also generate a vertical synchronization signal (Vsync) to determine one or more rows to be activated in the imaging sensor array 110.

The timing controller 170 may include a frame synchronization signal (Fsync) converter 180. The frame synchronization signal (Fsync) converter 180 may convert the first frame synchronization signal (Fsync1) into another signal appropriate for operations of the third image sensor chip 200, and may thus generate the second frame synchronization signal (Fsync2). As shown in FIG. 3, in an embodiment of the disclosed technology, the frame synchronization signal (Fsync) converter 180 may be implemented in the timing controller 170. In another embodiment, the frame synchronization signal (Fsync) converter 180 may be implemented outside the timing controller 170 as a separate element.

As discussed above, the first frame synchronization signal (Fsync1) is converted to a frame synchronization signal that is appropriate for the operations of the third image sensor chip 200, and this conversion scheme may be predefined based on characteristics of the third image sensor chip 200. For example, characteristics of the third image sensor chip 200 may include a synchronization scheme, a resolution, a frame rate, etc., and the conversion scheme of the frame synchronization signal based on various characteristics will hereinafter be described with reference to FIGS. 4 to 6.

In another embodiment, the frame synchronization signal (Fsync) converter 180 may convert the first frame synchronization signal (Fsync1) to a frame synchronization signal that is appropriate for the operations of the third image sensor chip 200, and may also convert the first frame synchronization signal (Fsync1) to frame synchronization signal that is appropriate for the operations of the second image sensor chip 100. In this case, the timing controller 170 may control the constituent elements of the second image sensor chip 100 in a manner that image data corresponding to a single frame can be generated and output during a frame time based on a frame synchronization signal (e.g., a third frame synchronization signal) acquired by the conversion of the first frame synchronization signal (Fsync1).

FIG. 3 illustrates the second image sensor chip 100 as an example. In some embodiments of the disclosed technology, the first image sensor chip 50 and the third image sensor chip 200 may include all the elements of the second image sensor chip 100 other than the frame synchronization signal (Fsync) converter 180.

Figure 4:
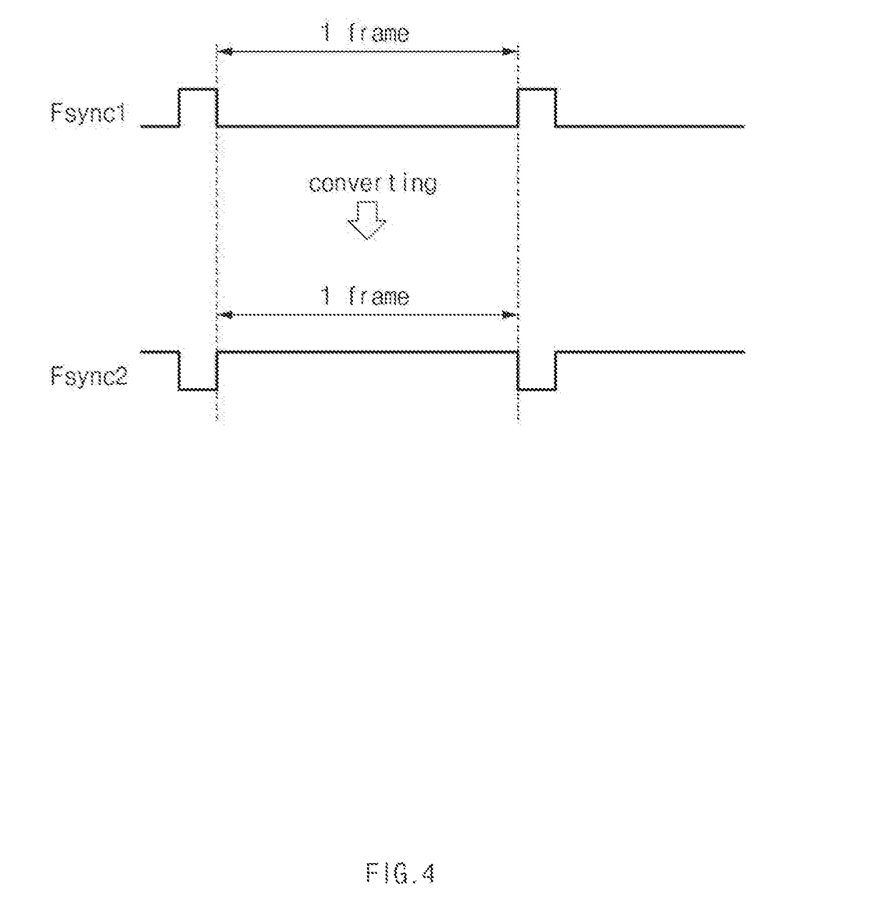
FIG. 4 is a timing diagram illustrating example conversion operations of a frame synchronization signal (Fsync) converter shown in FIG. 3 based on an embodiment of the disclosed technology.

FIG. 4 is a timing diagram illustrating example conversion operations of the frame synchronization signal (Fsync) converter 180 shown in FIG. 3.

It is assumed that each of the first image sensor chip 50 and the second image sensor chip 100 operates based on the synchronization scheme in which the falling edge of the frame synchronization signal is recognized as a frame start point and the rising edge of the frame synchronization signal is recognized as a frame end point. Therefore, based on the first frame synchronization signal (Fsync1), each of the first image sensor chip 50 and the second image sensor chip 100 may recognize it as a single frame (1 frame) as represented by the timing diagram shown in FIG. 4.

However, in a case where the third image sensor chip 200 operates based on another synchronization scheme that is different from that of the first image sensor chip 50 and the second image sensor chip 100, the conversion of the first frame synchronization signal (Fsync1) is needed. It is assumed that the third image sensor chip 200 operates based on the other synchronization scheme in which the rising edge of the frame synchronization signal is recognized as the frame start point and the falling edge of the frame synchronization signal is recognized as the frame end point. If the third image sensor chip 200 receives the first frame synchronization signal (Fsync1) without conversion, the third image sensor chip 200 may erroneously recognize the frame start point as the frame end point (and vice versa), causing the third image sensor chip 200 not to generate and output image data correctly.

In some embodiments of the disclosed technology, upon reception of the first frame synchronization signal (Fsync1), the frame synchronization signal (Fsync) converter 180 of the second image sensor chip 100 may invert a level of the first frame synchronization signal (Fsync1) to generate the second frame synchronization signal (Fsync2). The frame synchronization signal (Fsync) converter 180 may transmit the second frame synchronization signal (Fsync2) to the third image sensor chip 200.

In this way, the third image sensor chip 200, which is configured to operate based on the second frame synchronization signal (Fsync2), can operate based on the first frame synchronization signal (Fsync1). Thus, the third image sensor chip 200 may recognize the corresponding frame as a frame (i.e., 1 frame) having the same timings as intended by the first frame synchronization signal (Fsync1), such that normal image data can be generated and output.

Figure 5:
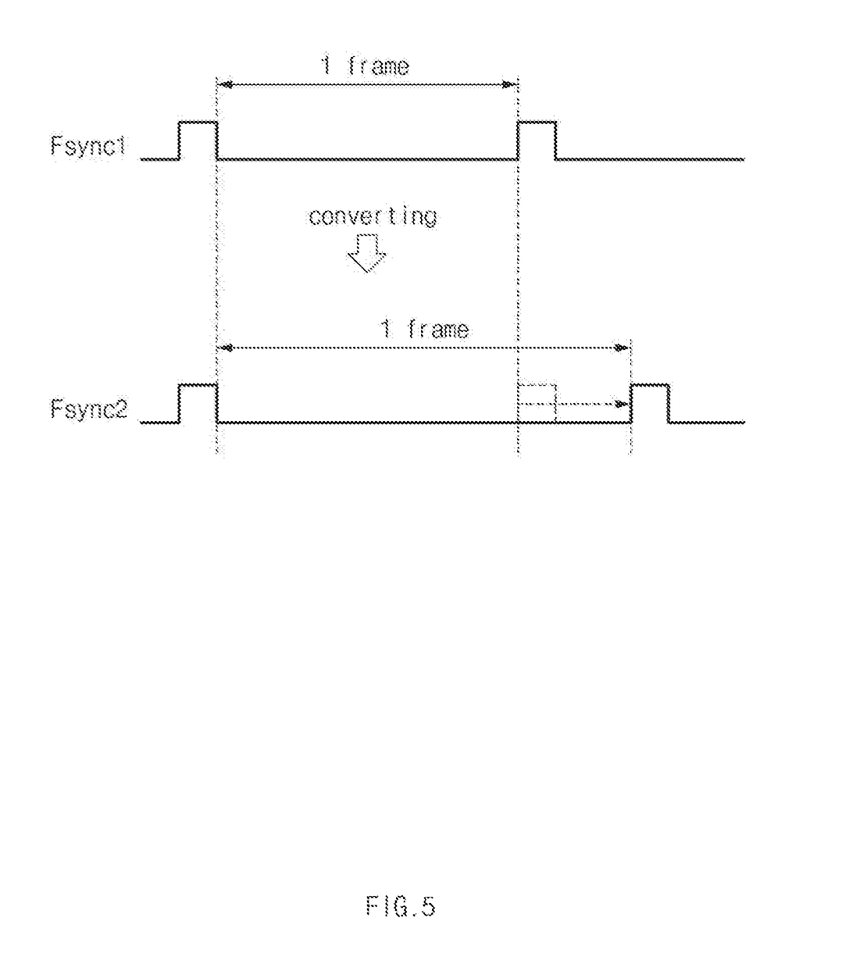
FIG. 5 is a timing diagram illustrating other example conversion operations of the frame synchronization signal (Fsync) converter shown in FIG. 3 based on an embodiment of the disclosed technology.

FIG. 5 is a timing diagram illustrating other example conversion operations of the frame synchronization signal (Fsync) converter shown in FIG. 3.

Referring to FIG. 5, it is assumed that the resolution of image data generated by the third image sensor chip 200 is higher than the resolution of image data generated by each of the first image sensor chip 50 and the second image sensor chip 100. The first image sensor chip 50 and the second image sensor chip 100 may generate and output image data within a single frame (1 frame) based on the first frame synchronization signal (Fsync1).

However, since the resolution of image data generated by the third image sensor chip 200 is higher than the resolution of image data generated from each of the first image sensor chip 50 and the second image sensor chip 100, the third image sensor chip 200 may fail to output the entire image data within a single frame (1 frame) of the first frame synchronization signal (Fsync1), and thus unexpected data loss may occur unless the first frame synchronization signal (Fsync1) is converted.

The frame synchronization signal (Fsync) converter 180 of the second image sensor chip 100 may receive the first frame synchronization signal (Fsync1), may delay a time point (e.g., the rising edge) indicating the frame end point of the first frame synchronization signal (Fsync1) by a predetermined time (e.g. lagging of the rising edge) to generate the second frame synchronization signal (Fsync2). The frame synchronization signal (Fsync) converter 180 may transmit the second frame synchronization signal (Fsync2) to the third image sensor chip 200.

In this case, the predetermined time may be determined based on a frame time in which the third image sensor chip 200 can normally generate and output the image data. In addition, the delay of the time point indicating the frame end point of the first frame synchronization signal (Fsync1) by a predetermined time may also indicate that a frequency of the first frame synchronization signal (Fsync1) is gradually reduced in proportion to the increasing frame time.

The third image sensor chip 200 operates based on the second frame synchronization signal (Fsync2) having the increased frame time, such that the third image sensor chip 200 can generate and output normal image data without occurrence of data loss in a single frame (1 frame) of the second frame synchronization signal (Fsync2).

Figure 6:
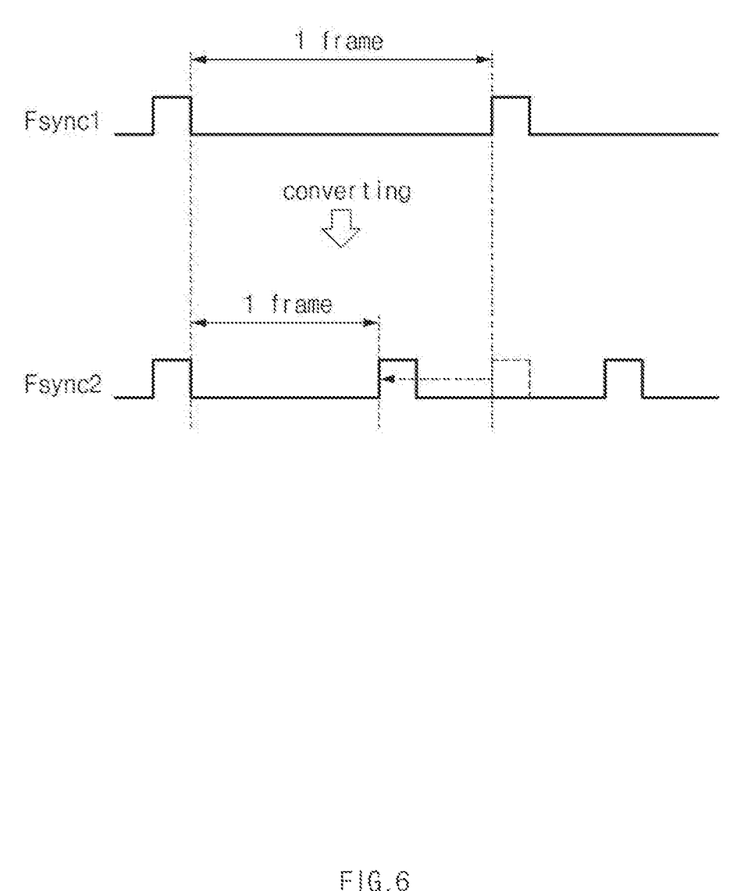
FIG. 6 is a timing diagram illustrating still other example conversion operations of the frame synchronization signal (Fsync) converter shown in FIG. 3 based on an embodiment of the disclosed technology.

FIG. 6 is a timing diagram illustrating still other example conversion operations of the frame synchronization signal (Fsync) converter 180 shown in FIG. 3 based on an embodiment of the disclosed technology.

Referring to FIG. 6, it is assumed that resolution of image data generated by the third image sensor chip 200 is lower than the resolution of image data generated by each of the first image sensor chip 50 and the second image sensor chip 100. The first image sensor chip 50 and the second image sensor chip 100 may generate and output image data within a single frame (1 frame) based on the first frame synchronization signal (Fsync1).

However, the resolution of image data generated from the third image sensor chip 200 is significantly lower than the resolution of image data generated from each of the first image sensor chip 50 and the second image sensor chip 100. As a result, the residual time that remains after the third image sensor chip 200 generates and outputs image data within the single frame (1 frame) of the first frame synchronization signal (Fsync1) may be excessively elongated, deteriorating the frame rate of the third image sensor chip 200. If the third image sensor chip 200 is designed for a high-speed operation, the performance of the third image sensor chip 200 may be seriously deteriorated.

In some embodiments of the disclosed technology, the frame synchronization signal (Fsync) converter 180 of the second image sensor chip 100 may receive the first frame synchronization signal (Fsync1), may advance a time point (e.g., the rising edge) indicating the frame end point of the first frame synchronization signal (Fsync1) by a predetermined time (e.g., leading of the rising edge) to generate the second frame synchronization signal (Fsync2). The frame synchronization signal (Fsync) converter 180 may transmit the second frame synchronization signal (Fsync2) to the third image sensor chip 200.

In this case, the predetermined time may be determined based on a frame time in which the third image sensor chip 200 can normally generate and output the image data. In addition, as a result of bringing forward the frame end point of the first frame synchronization signal (Fsync1) by a predetermined period of time, a frequency of the first frame synchronization signal (Fsync1) gradually increases in proportion to the decrease in the frame time.

The third image sensor chip 200 operates based on the second frame synchronization signal (Fsync2) having the reduced frame time, such that the third image sensor chip 200 can generate and output normal image data within a single frame (1 frame) of the second frame synchronization signal (Fsync2) and at the same time can operate at the improved frame rate.

In the case of using the image sensor group including a plurality of image sensor chips based on one embodiment of the disclosed technology, when the image sensor chips having different characteristics are combined and applied to a single electronic device, the image sensor group may control the respective image sensor chips using one or more frame synchronization signals appropriate for characteristics of each image sensor chip, such that the operations of the respective image sensor chips can be optimized.

In addition, some embodiments of the disclosed technology may also be applied to another example in which the image sensor group 10 includes more than three image sensor chips. That is, the image sensor group 10 based on the disclosed technology may convert at least one frame synchronization signal in a manner that at least one image sensor chip capable of performing such conversion of the frame synchronization signal converts the frame synchronization signal that is compatible with the operations of the respective image sensor chips, and may provide the converted frame synchronization signal to each image sensor chip, such that the respective image sensor chips can normally operate. For example, it is assumed that the image sensor group also includes a fourth image sensor chip in addition to the first to third image sensor chips 50, 100, and 200.

If the fourth image sensor chip operates in a different way from the third image sensor chip 200 or has a different specification from the third image sensor chip 200, the second image sensor chip 100 may generate a third frame synchronization signal by converting the first frame synchronization signal (Fsync1) into another signal appropriate for operations of the fourth image sensor chip, and may transmit the third frame synchronization signal to the fourth image sensor chip. In this case, the second image sensor chip 100 may include one additional master pin needed to output the third frame synchronization signal.

If the fourth image sensor chip operates in the same manner as in the third image sensor chip 200 and has the same or similar specification as in the third image sensor chip 200, the second image sensor chip 100 may also transmit the second frame synchronization signal (Fsync2) acquired by conversion of the first frame synchronization signal (Fsync1) to the fourth image sensor chip in the same manner as in the third image sensor chip 200.

In accordance with another embodiment of the disclosed technology, if the fourth image sensor chip operates in a different way from the third image sensor chip 200 or is different in specification from the third image sensor chip 200, the third image sensor chip 200 may convert the second frame synchronization signal (Fsync2) into another signal appropriate for operations of the fourth image sensor chip, may generate a third frame synchronization signal, and may transmit the third frame synchronization signal to the fourth image sensor chip. In this case, the third image sensor chip 200 may include one additional master pin needed to output the third frame synchronization signal.

It is understood that various embodiments and terminology used herein are not intended to limit technical ideas described in this document to specific embodiments, but rather to include various modifications, equivalents, and/or alternatives of the embodiments. Wherever possible, the same reference numbers will be used throughout the drawings to refer to the same or like portions. As used in the specification and appended claims, the terms "a", "an", "one", "the" and other similar terms include both singular and plural forms, unless context clearly dictates otherwise. A singular representation may include a plural representation unless otherwise stated in context. In the present application, an expression such as "A or B", "at least one of A and B", "at least one of A or B", "A, B or C", "at least one of A, B and C", or "at least one of A, B, or C" may include all possible combinations of one or more items selected from among listed related items. An expression such as "first" and "second" used in the present application may indicate corresponding constituent elements regardless of order and/or importance, is used to distinguish a constituent element from another constituent element, and does not limit corresponding constituent elements. When it is described that a constituent element (e.g., a first constituent element) is "(functionally or communicatively) coupled to" or is "connected to" another constituent element (e.g., a second constituent element), it should be understood that the constituent element may be directly (e.g., by wire) connected to the other constituent element, may be wirelessly connected to the other constituent element, or may be connected to the other constituent element through another constituent element (e.g., a third constituent element).

The term "module" as used in the present application includes a unit configured with hardware, software, or firmware and may be interchangeably used with a term such as a logic, logic block, component, or circuit. The term "module" may be an integrally configured component or a minimum unit or a portion thereof that performs at least one function. The term "module" may be implemented mechanically or electronically and may include, for example, an application-specific integrated circuit (ASIC).

Various embodiments of the present application may be implemented as software (e.g., program) including one or more instructions stored in a storage medium (e.g., on-board memory or external memory) readable by a machine (e.g., electronic device). For example, a processor (e.g., processor) of the machine (e.g., the electronic device) may retrieve at least one instruction from among the instructions stored in the storage medium, and may execute the retrieved instruction, such that the machine can operate to perform at least one function in response to the at least one retrieved instruction. The one or more instructions may include code generated by a compiler or code capable of being executed by an interpreter. The machine-readable storage medium may be implemented as a non-transitory storage medium. In this case, the term "non-transitory storage medium" may indicate that the storage medium is a tangible device and does not include signals (e.g., electromagnetic waves), and the term "non-transitory" does not discriminate between one case in which data is permanently stored in the storage medium and the other case in which data is temporarily stored in the storage medium.

In accordance with various embodiments, methods based on various embodiments disclosed in the present application may be contained in a computer program product, and may then be provided to users. The computer program products may be traded between sellers and buyers as goods. The computer program product may be implemented as a machine-readable storage medium (e.g., a compact disc read only memory CD-ROM) and then rapidly distributed to users. Alternatively, the computer program product may be directly distributed to two user devices (e.g., smartphones), may be distributed to two user devices (e.g., smartphones) through an application store (e.g., PlayStore™), or may be distributed online to two user devices (e.g., smartphones) (e.g., downloaded or uploaded). In online distribution, at least a portion of the computer program product may be temporarily or provisionally stored in a machine-readable storage medium, for example, a server of a manufacturing company, a server of an application store, or a memory of a relay server.

In accordance with various embodiments, each (e.g., a module or program) of the above-mentioned constituent elements may include one or more entities. In accordance with various embodiments, at least one constituent element from among the above-mentioned constituent elements or at least one operation may be omitted, or one or more other constituent elements or one or more other operations may be added. Alternatively or additionally, the plurality of constituent elements (e.g., modules or programs) may be integrated into only one constituent element. In this case, the integrated constituent element may perform one or more functions of each of the plurality of constituent elements in the same way as or in a similar way to the previous operation that has been executed by the corresponding constituent element from among the plurality of constituent elements prior to execution of such integration. Based on various embodiments, operations performed by a module, a program, or another constituent element may be sequentially, parallelly, repeatedly, or heuristically executed, at least one of the above operations may be executed in different order or omitted, or another operation may be added.

As is apparent from the above description, the embodiments of the disclosed technology may control a plurality of image sensor chips having different characteristics for use in a single electronic device using a frame synchronization signal compatible with characteristics of respective image sensor chips, such that operations of the respective image sensor chips can be optimized.

The embodiments of the disclosed technology may provide a variety of effects capable of being directly or indirectly recognized through the above-mentioned patent document.

Those skilled in the art will appreciate that the disclosed technology may be carried out in other specific ways than those set forth herein without departing from the spirit and essential characteristics of the disclosed technology. The above embodiments are therefore to be construed as illustrative and not restrictive. The scope of the disclosed technology should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment of the disclosed technology or included as a new claim by a subsequent amendment after the application is filed.

Although a number of illustrative embodiments consistent with the disclosed technology have been described, it should be understood that numerous other modifications and embodiments can be devised based on this disclosure. Particularly, numerous variations and modifications are possible in the component parts and/or arrangements within the scope of the disclosure of this patent document. In addition to variations and modifications in the component parts and/or arrangements, alternative uses may be apparent to those ordinarily skilled in the art.

What is claimed is:

1. An image sensor chip comprising:
    a frame synchronization signal converter configured to convert a first frame synchronization signal received from a first image sensor chip separate from the image sensor chip to generate a second frame synchronization signal based on characteristics of the image sensor chip; and
    an image generation block including an array of imaging sensor pixels to receive incident light to generate image data and coupled to the frame synchronization signal converter and configured to generate the image data based on the second frame synchronization signal at the same time point as the first frame synchronization signal,
    wherein the characteristics of the image sensor chip include at least one of a synchronization scheme, a resolution, or a frame rate, and
    wherein the frame synchronization signal converter generates the second frame synchronization signal by changing a rising edge of the first frame synchronization signal to a falling edge and changing the falling edge of the first frame synchronization signal to the rising edge.

2. The image sensor chip according to claim 1, wherein the frame synchronization signal converter generates the second frame synchronization signal by inverting a logic level of the first frame synchronization signal.

3. The image sensor chip according to claim 2, wherein the second frame synchronization signal is transmitted to a third image sensor chip separate from the image sensor chip and the first image sensor chip and configured to operate in a different synchronization scheme from the first image sensor chip.

4. The image sensor chip according to claim 1, wherein the frame synchronization signal converter is configured to generate the second frame synchronization signal by delaying a time point indicating a frame end point of the first frame synchronization signal by a predetermined time.

5. The image sensor chip according to claim 4, wherein the second frame synchronization signal is transmitted to a third image sensor chip separate from the image sensor chip and having a higher resolution than the first image sensor chip.

6. The image sensor chip according to claim 1, wherein the frame synchronization signal converter is configured to generate the second frame synchronization signal by advancing a time point indicating a frame end point of the first frame synchronization signal by a predetermined time.

7. The image sensor chip according to claim 6, wherein the second frame synchronization signal is transmitted to a third image sensor chip having a lower resolution than the first image sensor chip.

8. The image sensor chip according to claim 1, further comprising:
    a slave pin configured to receive the first frame synchronization signal from the first image sensor chip; and
    a master pin configured to transmit the second frame synchronization signal to a third image sensor chip.

9. The image sensor chip according to claim 1, further comprising:
    a timing controller configured to control the image generation block in a manner that image data corresponding to a single frame is generated and output during a frame time based on the first frame synchronization signal.

10. The image sensor chip according to claim 9, wherein the timing controller generates a horizontal synchronization signal and a vertical synchronization signal in response to the first frame synchronization signal,
    wherein the horizontal synchronization signal determines a range of pixels to be activated in a single row of a pixel sensor array, and the vertical synchronization signal determines one or more rows to be activated in the pixel sensor array.

11. An electronic device comprising:
    an image sensor group including first, second and third image sensor chips, the first image sensor chip configured to generate a first frame synchronization signal, the second image sensor chip configured to convert the first frame synchronization signal to generate a second frame synchronization signal based on characteristics of the third image sensor chip, the third image sensor chip configured to receive the second frame synchronization signal from the second image sensor chip; and
    a host in communication with the image sensor group and configured to process image data received from the image sensor group,
    wherein the characteristics of the third image sensor chip include at least one of a synchronization scheme, a resolution, or a frame rate, and
    wherein the second image sensor chip generates the second frame synchronization signal by changing a rising edge of the first frame synchronization signal to a falling edge and changing the falling edge of the first frame synchronization signal to the rising edge.

12. The electronic device according to claim 11, wherein each of the first to third image sensor chips generates the image data in response to either a request of the host or an interrupt message.

13. The electronic device according to claim 11, wherein the image sensor group further includes a fourth image sensor chip configured to receive, from the second image sensor chip, a third frame synchronization signal acquired by converting the first frame synchronization signal.

14. The electronic device according to claim 11, wherein the second image sensor chip generates the second frame synchronization signal by inverting a logic level of the first frame synchronization signal.

15. The electronic device according to claim 14, wherein the third image sensor chip operates in a different synchronization scheme from the second image sensor chip.

16. The electronic device according to claim 11, wherein the second image sensor chip is configured to generate the second frame synchronization signal by delaying a time point indicating a frame end point of the first frame synchronization signal by a predetermined time.

17. The electronic device according to claim 16, wherein the third image sensor chip has a higher resolution than the second image sensor chip.

18. The electronic device according to claim 11, wherein the second image sensor chip is configured to generated the second frame synchronization signal by advancing a time point indicating a frame end point of the first frame synchronization signal by a predetermined time.

19. The electronic device according to claim 18, wherein the third image sensor chip has a lower resolution than the second image sensor chip.

20. A method for operating an image sensor chip comprising:
   generating a second frame synchronization signal by converting a first frame synchronization signal received from a first image sensor chip based on characteristics of the image sensor chip; and
   generating image data based on the second frame synchronization signal at the same time point as the first frame synchronization signal,
   wherein the characteristics of the image sensor chip include at least one of a synchronization scheme, a resolution, or a frame rate, and
   wherein the frame synchronization signal converter generates the second frame synchronization signal by changing a rising edge of the first frame synchronization signal to a falling edge and changing the falling edge of the first frame synchronization signal to the rising edge.

* * * * *